United States Patent [19]

Thompson, III

[11] Patent Number: 4,532,285
[45] Date of Patent: Jul. 30, 1985

[54] ORGANOCLAY ANTIOZONANT COMPLEX

[75] Inventor: Thomas D. Thompson, III, Upper Black Eddy, Pa.

[73] Assignee: Georgia Kaolin Company, Inc., Union, N.J.

[21] Appl. No.: 614,697

[22] Filed: May 29, 1984

Related U.S. Application Data

[63] Continuation of Ser. No. 511,707, Jul. 7, 1983, abandoned.

[51] Int. Cl.$^3$ ............................ C08K 9/04; C08K 5/18
[52] U.S. Cl. ............................... 524/255; 252/400 R; 524/925
[58] Field of Search ............... 524/255, 455, 457, 925; 564/434, 334, 330; 252/400 R, 401, 405

[56] References Cited

U.S. PATENT DOCUMENTS 3,674,705  7/1972  Hytrek .................................. 524/255

FOREIGN PATENT DOCUMENTS 630418  11/1949  United Kingdom .

OTHER PUBLICATIONS

E. R. Erickson et al., "A Study of the Reaction of Ozone with Polybutadiene Rubbers", Symposium on Effect of Ozone on Rubber, ASTM Special Technical Pub. No. 229, pp. 11–29, American Society for Testing Materials, Phil., Pa. (1958).

Document No. AD 27115, "Development of Ozone and/or Oxygen Resistant Polymers", Burke Research Co. Technical Report, Reproduced by Document Service Center, Knott Bldg. Dayton, Ohio (1968), 1 to 6, 13 to 14, 18, 25 to 27 and C-8.

John W. Jordan, "Organophilic Bentonites I", J. Physical & Colloid Chemistry 53, 294 (1949).

*Primary Examiner*—Veronica P. Hoke
*Attorney, Agent, or Firm*—William W. Habelt

[57] ABSTRACT

An organoclay-antiozonant complex suitable for incorporating in rubber formulations as an additive to inhibit and retard ozone attack is formed by complexing a substituted paraphenylenediamine antiozonant with an organoclay having been produced by treating a smectite-containing clay with a quaternary amine. The organoclay-antiozonant complex is preferably incorporated into the rubber formulation by first mixing the prepared organoclay-antiozonant complex with a naphthenic oil and a polar solvent to form a paste which is then added to the rubber formulation.

19 Claims, No Drawings

ORGANOCLAY ANTIOZONANT COMPLEX

This application is a continuation of application Ser. No. 511,707, filed July 7, 1983, now abandoned.

BACKGROUND OF THE INVENTION

The present invention relates generally to antiozonants for adding to rubber formulations to inhibit or prevent the ozone cracking of the final rubber product. More specifically, the present invention relates to an organoclay-antiozonant complex, a method of preparing the organoclay-antiozonant complex, and a method of incorporating the organoclay-antiozonant complex into a natural or synthetic rubber formulation.

It is well recognized that both synthetic and natural rubbers undergo deterioration due to ozone, an energized triatomic molecular form of oxygen commonly found in the atmosphere. The deterioration of rubber on exposure to the atmosphere due to traces of ozone present in the atmosphere is different from any deterioration caused by oxidation due to oxygen found in the atmosphere and is generally not inhibited by the same compounds which may inhibit oxygen deterioration of the rubber. Ozone reacts with the rubber and causes cracking particularly in places where the rubber is under tension. It is believed that ozone attacks the double bond in diene compounds in the rubber to form a molozonide which is very unstable and subsequently splits apart to form a zwitterion and a ketone resulting in the cleavage of the polymer backbone of the rubber and the formation of cracks therein. Subsequent deterioration of the zwitterions can cause further cleavage of the polymer backbone of the rubber and accelerate crack propagation therein.

It is well known in the art to incorporate in rubber formulations certain additives, termed antiozonants, which inhibit and retard such ozone cracking. It is common to add such ozonants to rubber formulations used in producing tires and other industrial rubber products. Although certain petroleum waxes which bloom to the surface of the rubber compound have been moderately effective as antiozonants, such waxes cannot provide adequate surface protection in instances where the rubber is under tension due to bending or flexing. Accordingly, it has become customary in the production of rubber to add antiozonant chemicals directly to the rubber formulation. By far, the most common ozonants for adding directly to the rubber formulation are aromatic amines such as substituted paraphenylenediamines. The various substituted paraphenylenediamines suitable as antiozonants is vast. Examples of particular substituted paraphenylenediamines suitable as antiozonants in rubber formulations are given in U.S. Pat. Nos. 3,645,966; 3,663,505; 3,773,717; and 3,778,286.

Substituted paraphenylenediamines can be represented by the following general formula:

There are three sub-categories of substituted paraphenylenediamines under this general formulation. If R and R' are both aryl compounds, then the substituted diaryl-paraphenylenediamine is a diaryl-paraphenylenediamine. If both R and R' are both akyl hydrocarbons, then the substituted paraphenylenediamine is a dialkyl-paraphenylenediamine. If R is a alkyl hydrocarbon and R' a aryl hydrocarbon, or vice versa, then the substituted paraphenylenediamine is a alkyl-arylparaphenylenediamine.

A drawback of these antiozonant compounds is that they tend to be somewhat unstable in that they may react with other compounds added to the rubber formulation such as fillers, accelerators, softeners, extenders and waxes. Additionally, such antiozonant compounds are volatile and even soluble in water, both properties which lessen their effectiveness as antiozonants. Improved chemical stability within the rubber formulation, reduced volatility, and lower solubility in water would all enhance the effectiveness of antiozonant compounds.

SUMMARY OF THE INVENTION

In accordance with the present invention, there is provided an organoclay-antiozonant complex suitable for incorporating in rubber formulations as a additive to inhibit and retard ozone attack. The organoclay-antiozonant is formed by complexing a substituted paraphenylenediamine antiozonant with an organoclay having been produced by treating a smectite-containing clay with a quaternary amine. It has been found that a synergistic effect is obtained when using the organoclay-antiozonant complex as an ozone inhibitor in rubber formulations. By forming the organoclay-antiozonant complex, more of the antiozonant is adsorbed into the inner layer surfaces of the organoclay thereby providing that the antiozonant is more stable, less volatile and less soluble in water when introduced into the rubber formulation.

The antiozonant is selected from the group consisting of diaryl-paraphenylenediamines, dialkyl-paraphenylenediamines, aryl-alkyl-paraphenylenediamenes, or mixtures thereof. In one preferred embodiment, the antiozonant comprises a six carbon alkyl-phenyl paraphenylenediamene.

Further in accordance with the present invention, the organoclay-antiozonant complex is prepared by reacting a smectite-containing clay with a quaternary amine and a substituted paraphenylenediamene antiozonant. In one embodiment of the method of preparing the organoclay-antiozonant complex, an unfractionated smectite-containing bentonite clay is blended with water to form a high solids content paste which is then mixed with a quaternary amine-antiozonant-polar solvent mixture to form the organoclay-antiozonant complex. In a further embodiment of the method of preparing the organoclay-antiozonant complex, a low solid aqueous dispersion of smectite-containing clay is prepared and then mixed with a mixture consisting of a quaternary amine and a substituted paraphenylene antiozonant. Preferably, the low solids aqueous clay dispersion is fractionated into a predominantly smectite-containing fraction and a predominantly non-smectite-containing fraction. The non-smectite-containing fraction is removed and the predominantly smectite-containing fraction mixed with the quaternary amine and antiozonant mixture to form the organoclay-antiozonant complex of the present invention.

Further in accordance with the present invention, there is provided a method of incorporating an antiozonant into a natural and synthetic rubber formulation comprising preparing an organoclay-antiozonant complex, mixing the organoclay-antiozonant complex with a naphtlenic oil and a polar solvent to form a paste, and adding the organoclay-antiozonant-oil paste to the rubber formulation.

DESCRIPTION OF THE PREFERRED EMBODIMENT

A better understanding of the practice and the effectiveness of the present invention may be gained from the discussion presented hereinafter with reference to the following examples. These examples are regarded as illustrative, but not in any way limiting, of the present invention:

EXAMPLE 1

A 6% solids aqueous dispersion of bentonite mined in the Kaycee area of Johnson County, Wyoming, was prepared by blunging crude bentonite in water with 0.2% tetra sodium pyrophosphate as a dispersing agent. This low solids aqueous dispersion was then fractionated by centrifugation to separate the dispersion into a substantially smectite portion and a subtantially non-smectite portion. The substantially smectite portion of the fractionated aqueous bentonite dispersion was then spray dried to yield a smectite powder, while the non-smectite portion thereof was discarded. A 60% solids smectite paste was then formed by adding 120 grams of water to 175 grams of the dried smectite powder. This high solids smectite paste was then treated by slowly adding thereto while stirring a mixture consisting of 69.0 grams of Bioquat 816-a quaternary amine (75% active dimethyl benzyl hydrogenated tallow ammonium chloride and 25% isopropanol) produced by Biodabs, Inc., 175 grams of Wingstay 100—an antiozonant (a blend of aryl paraphenylenediamines) produced by the Goodyear Chemical Division, and 175 grams of acetone. After a reaction period of approximately 1 hour, the resultant organoclay-antiozonant complex was dried and pulverized.

EXAMPLE 2

A 6% solids aqueous dispersion of bentonite mined in the Kaycee area of Johnson County, Wyoming, was prepared by blunging crude bentonite in water with 0.2% tetra sodium pyrophosphate as a dispersing agent. This low solids aqueous dispersion was then fractionated by centrifugation to separate the dispersion into a substantially smectite portion and a substantially non-smectite portion. The substantially non-smectite portion was discarded. The smectite portion of the low solids aqueous dispersion was then treated by slowly adding to 2917 grams of the low solids smectite dispersion (equivalent to 175 grams of dry smectite) while stirring a mixture consisting of 69.0 grams of quaternary amine (Bioquat 816), 175 grams of antiozonant (Wingstay 100) and 175 grams of acetone. After a reaction period of approximately 1 hour, the treated dispersion was filtered and the resultant filtercake of organoclay-antiozonant complex was dried and pulverized.

EXAMPLE 3

A 60% solids paste of bentonite mined in the Kaycee area of Johnson County, Wyoming, was prepared by adding 175 grams of dry bentonite to 120 grams of water while mixing on a Hobart mixer. This high solids paste was then treated by adding thereto while stirring a mixture consisting of 69.0 grams of quaternary amine (Bioquat 816), 175 grams of antiozonant (Wingstay 100), and 175 grams of acetone. After a reaction period of approximately 1 hour, the resultant organoclay-antiozonant complex was dried and pulverized.

EXAMPLE 4

The procedure described in Example 2 was followed except that 175 grams of Wingstay 200—an antiozonant (a blend of aryl paraphenylenediamines) produced by the Goodyear Chemical Division was used rather than Wingstay 100. Also, the 175 grams of acetone was omitted.

EXAMPLE 5

The procedure described in Example 2 was followed except that 175 grams of Wingstay 300—an antiozonant (an alkyl-aryl paraphenylenediamine) produced by the Goodyear Chemical Division was used rather than Wingstay 100. Also, the 175 grams of acetone was omitted.

EXAMPLE 6

A 60% solids paste of bentonite mined in the Kaycee area of Johnson County, Wyoming, was prepared by adding 175 grams of dry bentonite to 120 grams of water while mixing on a Hobart mixer. This high solids paste was then treated by adding thereto while stirring a mixture consisting of an antiozonant (Wingstay 100), and 175 grams of acetone. After a reaction period of approximately 1 hour, the resultant organoclay-antiozonant composition was dried and pulverized.

EXAMPLE 7

The procedure described in Example 6 was followed except that 175 grams of Wingstay 200—an antiozonant (a blend of aryl paraphenylenediamines) produced by the Goodyear Chemical Division was used rather than Wingstay 100. Also, the 175 grams of acetone was omitted.

EXAMPLE 8

The procedure described in Example 6 was followed except that 175 grams of Wingstay 300—an antiozonant (an alkyl-aryl paraphenylenediamine) produced by the Goodyear Chemical Division was used rather than Wingstay 100. Also, the 175 grams of acetone was omitted.

EXAMPLE 9

A 6% solids aqueous dispersion of bentonite mined in the Kaycee area of Johnson County, Wyoming, was prepared by blunging crude bentonite in water with 0.2% tetra sodium pyrophosphate as a dispersing agent. This low solids aqueous dispersion of crude bentonite was then treated, without fractionation, by slowing adding to 2,917 grams of the dispersion, while stirring, a mixture consisting of 69.0 grams of quaternary amine (Bioquat 816), 175 grams of antiozonant comprising diaryl paraphenylenediamines (Wingstay 200). After a reaction period of approximately 1 hour, the treated dispersion was filtered and the resultant filtercake of organoclay-antiozonant complex was dried and pulverized.

EXAMPLE 10

An organoclay-antiozonant-naphtlenic oil paste additive was prepared by dispersing 20 grams of the dry, pulverized organoclay-antiozonant of Example 3 in 45 grams of Circosol 4240, a naphtlenic oil produced by Sun Refining & Marketing Company. After a twenty minute mixing period, 5 grams of acetone was added and mixing ContinUed for an additional five minutes.

It should be noted that in each example, the smectite-containing clay was treated with a quaternary amine at a treatment level of 60 milliequivalents per 100 grams of clay. Also, in each example, the antiozonant was complexed with the clay at a ratio of 1 gram of anti per 1 gram of clay.

In order to determine the effectiveness of each of the organocaly-antiozonants presented in the examples, and also to determine the optimum procedures for producing an organoclay-antiozonant and incorporating it into a rubber formulation, each of the organoclay-antiozonant complexes prepared in the examples was used as an additive to the following rubber formulation:

| Ingredient | Parts by Weight |
| --- | --- |
| SBR 1502 (styrene-butadiene copolymer) | 100 |
| Fine particles size kaolin | 100 |
| Organoclay-antiozonant | see example |
| Antioxidant | 1 |
| Zinc oxide | 5 |
| Stearic acid | 2 |
| Sulfur | 3 |
| MBT (mercaptobenezothiozole) | 1.25 |
| DOTG (di-ortho-tolylguanidine) | 0.5 |

The organoclay-antiozonants of Examples 1 through 9 were added to the rubber formulation at a concentration of 4 parts by weight per 100 parts by weight of rubber formulation. The organoclay-antiozonant-oil paste of Example 10 was added at a concentration of 14 parts by weight per 100 parts by weight of rubber formulation which was equivalent to adding 4 parts per 100 rubber of the organoclay-antiozonant. Each of the rubber formulations to which the organoclay-antiozonants of the examples were added was cured in accordance with standard procedures to produce a rubber product. Each of the rubber products was then tested in accordance with the procedures outlined in ASTM tests D-518A and D-1149 to determine the effectiveness of each of the organoclay-antiozonant by exposing the rubber products to ozone and observing the cracking of the rubber products under ozone exposure. The tests were conducted at a temperature of 40° C. with the rubber product under 10% elongation and exposed to an ozone concentration of 50 parts per hundred million. The rubber products were observed for both the formation of No. 1 and No. 3 Cracks. A No. 1 Crack is defined as a crack visible only under a magnification of seven times, while a No. 3 Crack is defined as a crack visible to the unaided eye. Additionally, observations were made for the rubber product with and without having been previously soaked in oil. The oil-soaked rubber products were each soaked in oil at 50° C. for 7 days with each sample being wiped once daily. After seven days, the oil-soaked rubber products were rinsed with heptane in order to remove excess oil prior to being exposed to the ozone.

The results of these observations are set forth in Table I wherein the time to cracking is indicated in hours for both the formation of No. 1 and No. 3 Cracks for the rubber products formed from rubber formulations incorporating the organoclay-antiozonants presented in the Examples 1 through 10.

TABLE I

| Rubber Formulation Incorporating the Organoclay-Antiozonant of | No. 1 Crack | No. 3 Crack | No. 1* Crack | No. 3* Crack |
| --- | --- | --- | --- | --- |
| Example 1 | — | — | 5 | 12 |
| Example 2 | 2 | 5 | 11 | 15 |
| Example 3 | 2 | 3 | 4 | 10 |
| Example 4 | 6 | 10 | 9 | 13 |
| Example 5 | 7 | 10 | 10 | 14 |
| Example 6 | 2 | 4 | 7 | 11 |
| Example 7 | 1 | 2 | 9 | 10 |
| Example 8 | 7 | 9 | 8 | 13 |
| Example 9 | — | — | 9 | 10 |
| Example 10 | 7 | 10 | 11 | 15 |
| Control 1 | 2 | 8 | 9 | 10 |
| Control 2 | 5 | 6 | 10 | 14 |

*rubber formulation soaked in oil for 7 days hours prior to ozone exposure.

Control Sample 1 and Control Sample 2 presented in Table I represent rubber formulations wherein an antiozonant was added to the rubber formulation but not complexed with an organoclay prior to addition to the rubber formulation. In Control Sample 1, the antiozonant Wingstay 100 was added to the rubber formulation at a concentration of two parts by weight per 100 parts by weight of rubber. In Control Sample 2, the antiozonant Wingstay 100 was added to the rubber formulation at a concentration of 2 parts by weight per 100 parts by weight of rubber and also the naphthenic oil Circosol 4240 was added to the rubber formulation at a concentration of 9 parts by weight per 100 parts by weight of rubber.

Additionally, in order to determine if any one of the paraphenylenediamine antiozonants which were to be complex with organoclays in accordance with the present invention was per se a better antiozonant than the others, the three different paraphenylenediamines used in the present study, that is, Wingstay 100, Wingstay 200, and Wingstay 300, were each added to the aforementioned rubber formulation at a concentration of 2 parts by weight per 100 parts by weight of rubber formulation:

After curing, each of the rubber products was tested for resistance to cracking under ozone exposure. It was found that each of the antiozonants, Wingstay 100, Wingstay 200, and Wingstay 300, were equivalent with regard to inhibiting ozone deterioration in the rubber product. That is, the substituted paraphenylenediamines themselves were equivalent in their effectiveness as antiozonants whether they were diarylparaphenylenediamines such as Wingstay 100 and Wingstay 200 or akyl-aryl paraphenylenediamines such as Wingstay 300. This point is further illustrated by comparing the times to form No. 1 and No. 3 Cracks for the rubber formulations formulated using the organoclay-antiozonant complexes of Examples 2, 4 and 5 wherein the organoclay-antiozonant complexes were formed in the same manner by treating a low solids smectite dispersion with a quaternary amine and an antiozonant mixture. Although the antiozonant was varied with Example 2 utilizing Wingstay 100, Example 4-Wingstay 200, and Example 5-Wingstay 300, the resultant rubber formulations had approximately the same resistance to ozone deterioration.

It was found that the method of forming the organoclay into which the antiozonant is complexed affected the performance of the organoclay-antiozonant complex in inhibiting ozone deterioration in rubber formulations. Preferably, the organoclay utilized to form an organoclay-antiozonant complex in accordance with the present invention is formed by first fractionating the crude bentonite clay into a substantially smectite containing portion and a substantially non-smectite portion, discarding the non-smectite portion and treating only the smectite containing portion with the quaternary amine to form the organoclay. This point is illustrated by comparing Example 1 to Example 3 and also by comparing Example 4 to Example 9. In Example 1, the organoclay was formed by treating a 60% solids paste of substantially pure smectite with the quaternary amine while in Example 3 a 60% solids paste of the whole crude was treated with the quaternary amine. As shown in Table I, the organoclay-antiozonant complex of Example 1 performed better than the organoclay-antiozonant complex of Example 3 and also better than Control Sample 1. In Example 4, the organoclay was formed by treating a 6% solids dispersion of substantially pure smectite with a quaternary amine while the organocaly of Example 9 was formed by treating a 6% solids dispersion of the whole crude. As seen in Table I, the organoclay-antiozonant complex of Example 4 performed substantially better than the organoclay-antiozonant complex of Example 9 and also of Control Sample 1.

Further, it is preferred in the present invention to form the organoclay into which the antiozonant is to be complexed by treating a low solids smectite dispersion with the quaternary amine rather than a high solids paste of the smectite. In Example 1, the organoclay with which the antiozonant is complexed was formed by treating a 60% solids smectite paste with a mixture containing the quaternary amine and the antiozonant Wingstay 100. In Example 2, a 6% solids aqueous smectite dispersion was treated with a mixture of a quaternary amine and the antiozonant Wingstay 100. As seen in Table II, the organoclay-antiozonant formed in accordance with Example 2 from a low solids smectite dispersion performed significantly better than the organoclay-antiozonant complex of Example 1 formed from a high solids smectite paste in the inhibiting of ozone deterioration. In both cases, it took longer for a No. 3 Crack to form in a rubber product soaked in oil than it did for the rubber product of Control Sample 1 wherein the antiozonant Wingstay 100 was uncomplexed when added to the rubber formulation.

In accordance with the present invention, the antiozonant compounds must be complexed with an organoclay and preferably an organoclay formed from treating a low solids aqueous dispersion of substantially pure smectite. Examples 2, 4 and 5 were all formed by treating a 6% solids substantially pure smectite dispersion with a mixture containing a quaternary amine and a substituted paraphenylenediamine antiozonant. The clay-antiozonant compositions of Examples 6, 7 and 8 were not prepared by complexing the antiozonant with the organoclay or even by forming an organoclay. Rather, the clay-antiozonant composition of Example 6, 7 and 8 were formed by merely mixing a substituted paraphenylenediamine antiozonant with a high solids paste of substantially whole crude smectite containing clay. As illustrated in Table I, the organoclay-antiozonant complexes of Examples 2, 4 and 5 performed significantly better in inhibiting ozone deterioration of the rubber products to which they were added than did the clay-antiozonant composition of Examples 6, 7 and 8. Therefore, in accordance with the present invention, it is required that the antiozonant be complexed with an organoclay prior to addition to the rubber formulation and not merely just mixed with a clay. It is believed that by forming an organoclay, the smectite becomes expanded and therefore more of the antiozonant may be absorbed into the inner layer, thereby explaining the synergistic effect of the clay and antiozonant when the antiozonant is complexed into an organoclay formed from the clay rather than being merely mixed with the clay prior to addition to the rubber formulation.

Further, it has been found that the method of incorporating the organoclay-antiozonant into the naturally syntehtic rubber formulation can also affect the performance of the organoclay-antiozonant in inhibiting ozone deterioration of the rubber product. In Example 10, the organoclay-antiozonant of Example 3 was first mixed with Circosol 4240, a naphthenic oil, and a polar solvent prior to addition to the rubber formulation to form a organoclay-antiozonant-naphtlenic oil paste. Upon the addition of this paste to the rubber formulation, it was found, as illustrated in Table I, that the organoclay-antiozonant-oil paste of Example 10 performed significantly better than the organoclay-antiozonant of Example 3 which was used to form the paste of Example 10. Additionally, the organoclay-antiozonant-oil paste of Example 10 performed significantly better than the antiozonant-oil additive of Control Sample 2 in inhibiting ozone deterioration. It is believed that in addition to forming a protective film, the naphtlenic oil improves dispersions of the organoclay-antiozonant into the rubber formulation.

Therefore, a preferred embodiment of the method of incorporating an antiozonant into a natural or synthetic rubber formation in accordance with the present invention comprises preparing an organoclay-antiozonant complex, mixing the organoclay-antiozonant complex with a naphtlenic oil and a polar solvent to form a paste, and adding the organoclay-antiozonant-oil paste to the rubber formulation.

It is to be understood that the organoclay-antiozonant complexes and the methods for forming same and incorporating same in a rubber formulation as recited hereinbefore in accordance with the present invention are presented by the applicants to comply with the requirement of Title 35, paragraph 112 of the U.S. Code and are not intended to be regarded as limiting the present invention to those particular embodiments. It is intended by the appended claims to cover any modifications which fall within the true spirit and scope of the present invention as set forth in the appended claims. It will be appreciated that modifications may readily be made by those skilled in the art to the embodiments of the present invention alluded to herein. For example, the methods for forming the organoclay with which the antiozonant is to be complexed as presented herein may be modified by those skilled in the art to use other well-known quaternary amines rather than dimethyl benzyl hydrogenated tallow ammonium chloride as presented herein and also to treat the clay with the amine at other treatment levels rather than the 60 milliequivalants per 100 grams of clay as disclosed herein without departing from the teachings of the present invention.

Although the effectiveness of the resultant organoclay-antiozonant complex in inhibiting ozone deterioration in the rubber product may be affected by the particular method of forming the organoclay, it is believed that any organoclay formed by treating a smectite containing clay with a quaternary amine will perform synergistically when comlexed with an antiozonant to enhance the antiozonant's ability to inhibit or retard ozone deterioration of the rubber product produced from any natural or synthetic rubber formulation to which the organoclay-antiozonant complex is added.

I claim:

1. A method for preparing an organoclay-antiozonant complex functional as an additive to rubber for inhibiting ozone oxidation, comprising mixing a smectite-containing clay with a mixture consisting of a quaternary amine, a polar solvent, and an antiozonant consisting of dialkyl paraphenyldiamines, diaryl paraphenylenediamines, alkyl-aryl parapheylenediamines, or mixtures thereof, so as to form an expanded organoclay derivative of said smectite-containing clay and said quaternary amine, said antiozonant being complexed with said organoclay derivative.

2. A method as recited in claim 1 further comprising:
   a. blending an unfractional smectite-containing bentonite clay with water to form a high solids content paste; and
   b. mixing said quaternary amine-antiozonant-solvent mixture with said high solids content paste of unfractionated smectite whereby said organoclay-antiozonant complex is formed.

3. A method as recited in claim 2 wherein the quaternary amine comprises dimethyl benzyl hydrogenated tallow ammonium chloride.

4. A method recited in claim 3 wherein the antiozonant comprises a six carbon alkyl-phenyl paraphenylenediamine.

5. A method as recited in claim 1 further comprising:
   a. preparing a low solids aqueous dispersion of smectite containing clay; and
   b. mixing said low solids aqueous clay dispersion with a mixture consisting of a quaternary amine and an antiozonant consisting of dialkyl paraphenylenediamines, diaryl paraphenyldiamines, alkyl-aryl paraphenylenediamines, or mixtures thereof whereby said organoclay-antiozonant complex is formed.

6. A method as recited in claim 5 further comprising:
   a. fractionating said low solids aqueous clay dispersion into a predominantly smectite containing fraction and a predominantly non-smectite containing fraction;
   b. removing the predominantly non-smectite containing fraction; and
   c. mixing the predominantly smectite containing fraction with said quaternary amine and antiozonant mixture whereby said organoclay-antiozonant complex is formed.

7. A method as recited in claim 6 wherein the quaternary amine comprises dimethyl benzyl hydrogenated tallow ammonium chloride.

8. A method as recited in claim 7 wherein the antiozonant comprises a six carbon alkyl-phenyl paraphenylenediamine.

9. An organoclay-antiozonant complex as recited in claim 1 wherein the antiozonant comprises an alkyl-aryl paraphenylenediamine.

10. An organoclay-antiozonant complex as recited in claim 1 wherein the antiozonant comprises a six carbon alkyl-phenyl paraphenylenediamine.

11. An organoclay-antiozonant complex as recited in claim 1 wherein the quaternary amine for treating the smectite containing clay comprises dimethyl benyl hydrogenated tallow ammonium chloride.

12. An organoclay-antiozonant complex as recited in claim 1 wherein the organoclay was produced by treating the smectite portion of a water-fractionated bentonite with a quaternary amine.

13. An organoclay-antiozonant complex as recited in claim 12 wherein the quaternary amine for treating the smectite portion of the water-fractionated bentonite comprises dimethyl benzyl hydrogenated tallow ammonium chloride.

14. A method of incorporating an antiozonant into natural or synthetic rubber formulations comprising:
   a. forming an organoclay-antiozonant complex by mixing a smectite-containing clay with a mixture consisting of a quaternary amine, a polar solvent, and an antiozonant consisting of dialkyl paraphenylenediamines, diaryl paraphenylenediamines, alkyl-aryl paraphenylenediamines, or mixtures thereof so as to form an expanded organoclay derivative of said smectite-containing clay and said quaternary amine, said antiozonant being complexed with said organoclay derivative;
   b. mixing said organoclay-antiozonant complex with a naphthenic oil and a polar solvent to form a paste; and
   c. adding said organoclay-antiozonant-oil paste to the rubber formulation.

15. A method as recited in claim 14 wherein the organoclay-antiozonant complex is prepared in accordance with the method of claim 8.

16. A method as recited in claim 14 wherein the organoclay-antiozonant complex is prepared in accordance with the method of claim 11.

17. A method as recited in claim 14 wherein the organoclay-antiozonant complex is prepared in accordance with the method of claim 12.

18. A method as recited in claim 14 wherein the organoclay-antiozonant complex comprises the organoclay-antiozonant complex of claim 1.

19. An antiozonant paste suitable for adding directly to natural or synthetic formulations for imparting thereto protection against ozone deterioration, comprising:
   a. about 20 weight units of an organoclay-antiozonant complex produced by treating a smectite-containing clay with a quaternary amine and antiozonant mixture so as to form an expanded organoclay derivative of said smectite-containing clay and said quaternary amine, said antiozonant being complexed with said organoclay derivative and being selected from the group consisting of diaryl paraphenylenediamines, dialkyl paraphenylenediamines, alkyl-aryl paraphenylenediamines, or mixtures thereof;
   b. about 45 weight units of a naphthenic oil; and
   c. about 5 parts weight units of a polar solvent.

* * * * *

UNITED STATES PATENT AND TRADEMARK OFFICE
CERTIFICATE OF CORRECTION

PATENT NO. : 4,532,285
DATED : July 30, 1985
INVENTOR(S) : Thomas D. Thompson III It is certified that error appears in the above—identified patent and that said Letters Patent is hereby corrected as shown below:

Claim 2, line 2, "unfractional" should be--unfractionated-- .

Claim 19, paragraph c, delete "parts".

Signed and Sealed this

Twenty-fourth Day of June 1986

[SEAL]

Attest:

DONALD J. QUIGG

Attesting Officer

Commissioner of Patents and Trademarks